March 8, 1938. J. W. FITZ GERALD 2,110,124
FILTER
Filed May 13, 1935
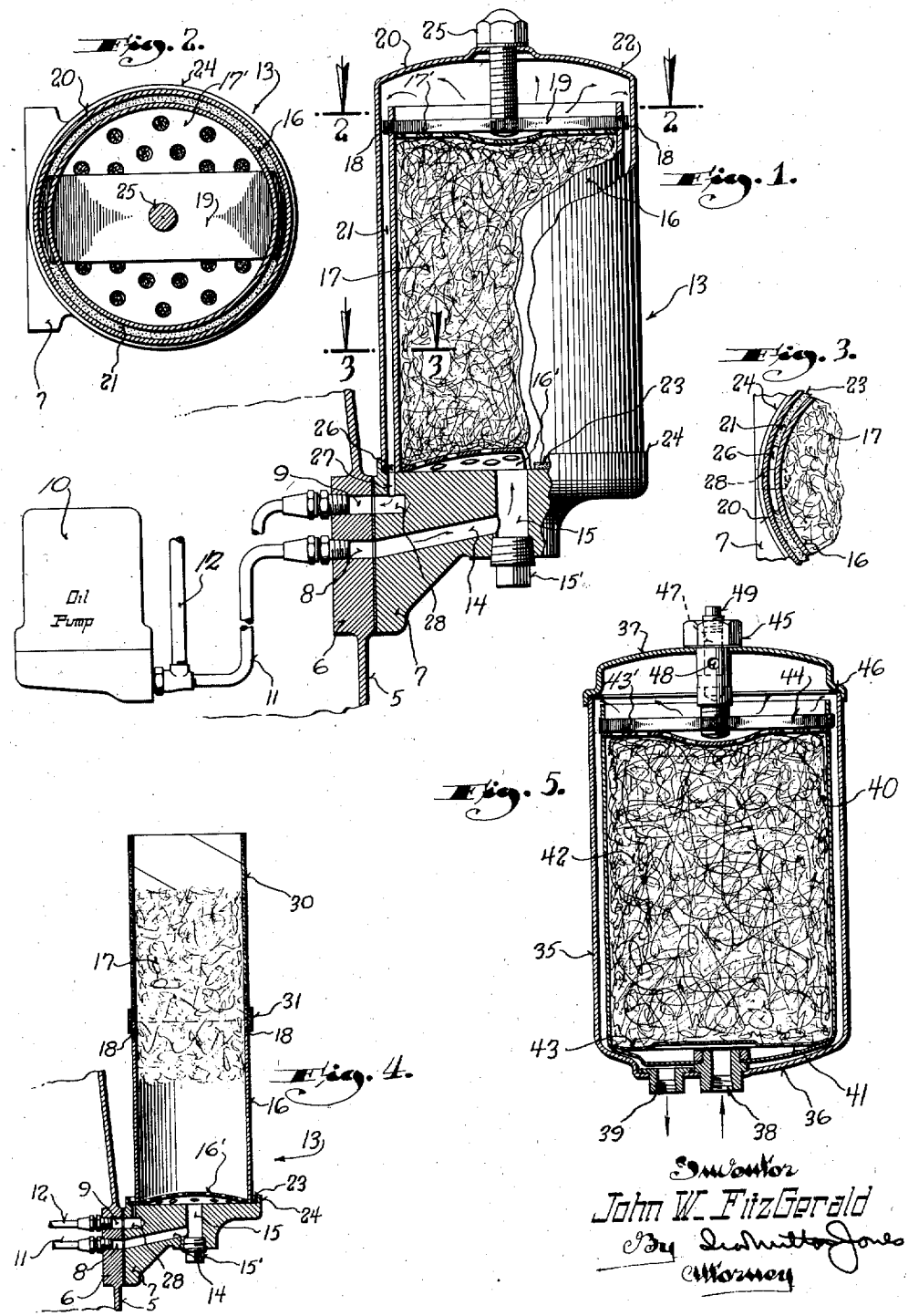
Inventor
John W. FitzGerald Patented Mar. 8, 1938

2,110,124

UNITED STATES PATENT OFFICE 2,110,124

FILTER

John W. Fitz Gerald, Milwaukee, Wis., assignor to Briggs & Stratton Corporation, Milwaukee, Wis., a corporation of Delaware Application May 13, 1935, Serial No. 21,281

9 Claims. (Cl. 210—131)

This invention relates to certain new and useful improvements in filters and refers more particularly to a removable cartridge type oil filter for use with automobile engines and the like.

The replaceable cartridge type of filter is in considerable use particularly on truck engines and the type generally employed has a removable outer shell or casing. Upon removal of this outer shell or casing, access is had to the filter material or cartridge which in many instances consists merely of a mass of cotton waste, so that the filter material may be readily removed and replaced with a fresh cartridge or quantity of waste when found desirable.

In the past, the construction of these replaceable filters has been such that the full pressure of the lubricant which is as high as thirty or forty pounds per square inch, was imposed on the gasketed joint between the outer shell or casing and its seat. Consequently, an expensive gasket construction had to be provided and invariably, notwithstanding the provision of elaborate gasket means, leakage at this point could not be prevented.

This condition obviously was objectionable, and it is therefore an object of the present invention to provide an oil filter of the character described which is so constructed that the full pressure of the system is not applied on the gasketed joint between the shell or cover and its seat. As a result, leakage at this point can be successfully prevented without expensive gasket means.

More specifically it is an object of this invention to provide an oil filter of the character described which is so constructed that all portions thereof subjected to the full pressure of the system have permanent joints so as to preclude the development of leaks either as a result of normal usage or removal and replacement of the filter material.

Another object of this invention is to provide a filter of the character described which is so constructed that reloading thereof is a simple matter.

A further object of this invention is to provide a novel method of reloading the filter with a fresh cartridge or filter mass.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates two complete examples of the physical embodiment of the invention constructed according to the best modes so far devised for the practical application of the principles thereof, and in which:

Figure 1 is a view partly in elevation and partly in transverse section of an oil filter embodying this invention and illustrating the manner of connecting the same with the lubricating system of an internal combustion engine;

Figure 2 is a cross section view taken through Figure 1 on the plane of the line 2—2;

Figure 3 is a detail cross section view through Figure 1 on the plane of the line 3—3;

Figure 4 is a section view through the filter on a reduced scale showing the manner of reloading the same; and Figure 5 is a vertical section view through a modified form of this invention.

Referring now more particularly to the accompanying drawing in which like numerals indicate like parts throughout the several views, the numeral 5 designates the crank case of a conventional internal combustion engine, only a portion of which is illustrated.

In heavy duty engines, such as used in trucks, the oil filter is usually mounted directly on one wall of the crank case, as shown in Figure 1. To mount the filter from the wall of the crank case as shown, the crank case is provided with a mounting pad 6 to the outer face of which a bracket 7 is secured. Two ports 8 and 9 pass through the crank case wall at the pad 6. One of these ports is connected with an oil pump 10 through a pipe line 11, and the other provides a return to the crank case for filtered lubricant.

The oil pump is also connected with a pipe line 12, which supplies the lubricating system (not shown) with the major portion of the oil being pumped. The remaining portion is shunted through the pipe line 11 to the port 8, to be forced through the filter, indicated generally by the numeral 13, and returned to the crank case supply through the port 9.

The bracket 7 has a passage 14 which aligns with and forms substantially an extension of the port 8 to communicate the same with a central bore 15 extending vertically through the bracket, the lower end of the bore being closed by a removable drain plug 15'. The upper end of the bore 15 opens to the interior of an inner shell 16 which consists of a cylinder extending up from the bracket and having its lower end permanently secured thereto in any desired manner, as by being welded directly to the top of the bracket.

This cylindrical inner shell 16 contains the filter cartridge which in the present instance consists merely of a quantity of cotton waste 17. To insure proper distribution of oil through the filter mass, perforated caps 16' and 17' are disposed at the bottom and near the top of the shell 16, respectively. At diametrically opposite points, the upper portion of the open top of the shell has oblong slots or openings 18 to receive the end portions of a cross bar 19. The cross bar 19 through its contact with the perforated cap 17' serves to hold the filter mass down in the inner shell 16 and also provides means for removably holding an outer shell or cover 20 in place.

The outer shell or cover 20 is also cylindrical and telescopes down over the inner shell 16 with a clearance space 21 therebetween. The top of the cover is closed by a wall 22 and the bottom thereof is open and sets on a gasket 23 encircling the inner shell and resting on the bracket 7.

An annular upstanding flange 24 extending up from the bracket encircles the gasket 23 and the lower portion of the housing or outer shell 20. The cover or outer shell is held down onto the gasket 23 by a cap screw 25 inserted through a hole in the top wall 22 of the cover and threaded into the cross bar 19.

The clearance space 21 between the inner shell and the cover is communicated with the bore 9 and consequently the crank case of the engine through aligned openings 26 and 27 in the gasket 23 and the adjacent portion of the bracket 7, respectively, which opening 27 leads to a stub bore 28 forming substantially a continuation of the port 9.

In operation the oil is pumped up into the filter through the central bore 15 and after passing freely up through the clean filter mass 17 flows down the annular space 21 between the inner shell and the cover to be discharged through the openings 26 and 27 and the bore 28 and port 9 back to the crank case of the engine. Obviously, the fluid pressure at the upper end of the filter, and consequently the pressure on the gasket 23, is not the full pressure of the system as the force of the pressure is spent to a considerable degree by the reaction of the filter mass retarding the flow of oil therethrough.

The reaction of the filter mass sets up stress which heretofore was imposed on the outer shell or cover and its gasketed joints. This stress was increased considerably as the filter mass became dirty and clogged. In the present invention the stress incidental to the reaction of the filter mass is carried entirely by the inner shell and the cross bar 19, thus relieving the outer shell and the gasket 23 of any pressure. Hence, it is possible to obtain a simple leak proof connection between the cover and the bracket 7 without resorting to expensive and elaborate gasketing means.

Another advantage of the present construction is that it facilitates reloading of the unit, and in Figure 4 a novel method of reloading is illustrated.

To replace the used filter material with a fresh mass of waste, the cover 20 is first removed by loosening the screw 25 and then the cross bar 19 and the perforated cap 17' are entirely removed. This permits unobstructed access to the interior of the filter so that the used filter material may be easily removed. After the used filter material is withdrawn from the inner shell 16, a fresh cartridge or charge of filter material is inserted. This cartridge or charge of filter material is packaged in a paper tube-like container 30 of substantially the same diameter as the inner shell 16 and provided at one end with a sleeve 31 adapted to be telescoped over the inner shell 16, as shown in Figure 4. The end walls of the package are both removable so that when the tube 30 is placed over the open end of the inner shell 16, as shown in Figure 4, the contents thereof may be easily pushed down into the inner shell, as will be readily apparent.

With the new filter material in place, the perforated cap 17' and the cross bar 19 are replaced and then merely by the simple expedient of telescoping the cover 20 over the inner shell and securing the same in place by means of the screw 25, the unit is again ready for service.

As indicated hereinbefore, the embodiment illustrated in Figures 1, 2, 3 and 4 is primarily adapted for use with heavy duty engines as found in automotive trucks. The same principle, however, is readily applicable to the type of filter used in passenger automobiles and in Figure 5 the application thereof to this type of filter is illustrated.

In this modified embodiment of the invention, an outer cylindrical shell 35 having its bottom closed by a wall 36 and its open top closed by a cover 37 detachably held in place forms the outer enclosure for the unit.

The bottom wall 36 is provided with an inlet port 38 and an outlet port 39. Disposed within the outer container 35 is an inner shell 40 which also has a closed bottom wall 41 firmly and permanently connected to the nipple providing the inlet port 38. The connection between the inner shell 40 and the outer enclosure is such that a clearance space is left between the same, not only at its sides but also at the bottom thereof.

As in the embodiment previously described, the inner shell contains a mass of filter material 42 and if desired, a perforated spacer 43 may be provided to hold the mass of filter material from the bottom 41 of the inner shell. Another perforated spacer 43' may be located at the top end of the filter mass.

A cross bar 44 is also provided, which like the cross bar 19, has its ends received in openings in diametrically opposite portions of the inner shell, and holds the filter mass firmly in place through its engagement with the perforated spacer 43'.

The cover 37 is held down on the open top of the outer container by a cap screw 45 of special construction which like the screw 25 is threaded in the cross bar 44, a gasket 46 being interposed between the open end of the outer container and the cover, which corresponds to the gasket 23.

The cap screw 45 in order to provide an outlet for the filtered material located at the upper end of the unit has a longitudinal bore 47 connected at its inner end with cross bores 48 so that the longitudinal bore 47 will be communicated with the space above the filter mass.

A plug 49 normally closes the outer end of the bore 47, which, when the upper discharge port is to be used, is removed and inserted in the discharge port 39.

The mode of operation in this construction is identical with that of the first described embodiment of the invention; that is, the lubricant to be filtered is shunted from the line leading to the lubricating system up into the inner shell and forced up through the filter mass to be discharged into the space between the inner shell and its outer container from which it flows either through the upper discharge port or the lower discharge port, as convenience may dictate, to the crank case supply.

As before, the stress incidental to the reaction of the filter mass is carried by the inner shell and the cross bar 44 relieving any pressure on the outer shell or its gasket 46, and precluding leakage at this point. The refilling or reloading of the filter is accomplished in the same manner as hereinbefore described.

From the foregoing description taken in connection with the accompanying drawing, it will be readily apparent to those skilled in the art to which this invention appertains, that this invention provides a filter of the replaceable cartridge type which by reason of its novel construction entirely overcomes the heretofore objectionable feature of this type of filter, namely, the difficulty of maintaining a leak proof connection between the outer cover and its seat.

What I claim as my invention is:

1. In an oil filter for use in connection with a force feed lubricating system of an internal combustion engine, an inner shell having an open end and a closed end, a filter mass in the inner shell and readily removable therefrom through its open end, means for enclosing the inner shell and including a removable cover disposed over the open end of the inner shell, and means for detachably securing said cover in place comprising a cross bar removably connected with the open end portion of the inner shell and extending across the open end thereof to hold the filter mass in place, and screw means passing through the cover and threaded in said cross bar.

2. In an oil filter for use in connection with a force feed lubricating system of an internal combustion engine, an inner shell having a closed end and an open end, a filter mass in the inner shell and readily removable therefrom through its open end, an outer enclosure for the inner shell adapted to receive fluid filtered by passage through the filter mass and discharged from the inner shell through its open end, said outer enclosure including a cover, and means for detachably holding the cover in place comprising a cross bar having its ends detachably connected with the open end portion of the inner shell to extend across the open end of the inner shell and hold the filter mass therein, and screw means engaging the cover and threaded in said cross bar.

3. An oil filter for use in connection with a force feed lubricating system of an internal combustion engine comprising, a base, an inner shell fixedly mounted on the base with its bottom closed by the base, the top of the inner shell being open, a filter mass in said inner shell and readily removable therefrom through its open top, a cover telescoped over the inner shell in spaced relation thereto with its periphery seated on the base, gasket means between the periphery of the cover and the base to prevent leakage therebetween, means having a readily detachable connection with the open end of the inner shell for detachably securing the cover in position and for transmitting any stress imposed on the cover in a direction tending to unseat the same from the base to the inner shell, an inlet port for fluid under pressure leading through the base from the force feed lubricating system directly into the lower portion of the inner shell to conduct fluid to be filtered under pressure into the inner shell for forced passage upwardly through the filter mass to be discharged into the space between the cover and the inner shell through the open top of the inner shell, and an outlet port for filtered fluid leading from the interior of the cover into the crank case of the engine.

4. An oil filter for use in connection with a force feed lubricating system of an internal combustion engine comprising, a base attached to the crank case of the engine and having an upstanding annular flange, a cylinder secured to the top of the base inside and spaced from said annular flange, the top of said cylinder being open, a filter mass within the cylinder, a cover telescoped down over the cylinder in spaced relationship thereto with its lower peripheral edge portion received snugly within said annular flange, gasket means between said lower peripheral edge portion of the cover and the base to prevent leakage therebetween, means for removably securing the cover in place comprising a cross bar having its ends readily detachably connected with the open topped portion of the cylinder and extending across the open top thereof to hold the filter mass therein, screw means connected with the cover and threaded in the cross bar, an inlet in the base leading from the force feed lubricating system directly into the lower portion of the cylinder for conducting fluid under pressure to the filter mass to be filtered thereby in its forced passage through the filter mass to the open top of the cylinder, and an outlet in the base leading from the space between the cover and cylinder into the crank case of the engine for conducting filtered fluid from the interior of the cover to the crank case.

5. In a filter of the character described, an outer shell having a closed bottom and an open top, an inner shell telescoped within the outer shell in spaced relationship thereto and having a closed bottom and an open top, common means for connecting the inner shell and outer shell at their closed bottoms and for providing an inlet port to the inner shell, a filter mass within the inner shell and readily removable therefrom through the open top thereof, a cover closing the outer shell and disposed over the open top of the inner shell, means for removably securing the cover in place comprising a cross bar having its ends detachably connected with the upper open end portion of the inner shell, screw means connected with the cover and threaded in said cross bar, said screw means being bored to provide an outlet port leading from the interior of the space between the outer enclosure provided by the cover and outer shell for filtered fluid, and an auxiliary outlet through the closed bottom of the outer shell.

6. An oil filter for use in connection with a force feed lubricating system of an internal combustion system comprising a shell closed on all sides except one, a filter mass in said shell, said filter mass being readily insertable and removable through the open side of the shell, inlet means for connecting the interior of the shell with the force feed lubricating system of the engine to conduct oil to be filtered to the shell for forced passage through the filter mass toward the open end of the shell, an exterior wall fixed with respect to the shell, a cover for closing the open side of the shell, and adapted to have a fluid tight connection between the cover and said fixed wall, said fixed wall and the cover together forming an enclosure for the shell and providing a closed chamber for receiving filtered fluid which has been forced through the filter mass, outlet means for conducting filtered fluid from said chamber to the crank case of the engine, means supported entirely from said shell and disposed at the open end of the shell to carry the stress incidental to the forced passage of the fluid through the filter mass, and means engaged with said last named means for readily detachably holding the cover in place so that any force imposed on the cover and tending to unseat it from said fixed wall is carried by said stress carrying means.

7. An oil filter for use in connection with a forced feed lubricating system of an internal combustion engine comprising, a container having an open end, a filter mass in the container, said filter mass being readily insertable and removable through the open end thereof, inlet means for introducing fluid to be filtered from the force feed system into the container for forced passage through the filter mass toward the open end thereof, such forced passage of the fluid through the filter mass tending to push the same out through the open end of the container, means supported entirely by the container to hold the filter mass against being pushed from the open end thereof, and an exterior cover seat fixed with respect to the container, a cover member for the open end of the container, said cover member engaging said seat and cooperating therewith to provide a chamber into which the filtered fluid is discharged from the open end of the container, means receiving support from the container for readily detachably holding the cover in place and for transmitting any stress imposed on the cover in a direction tending to unseat the same to the container, and an outlet leading from said chamber to the crank case of the engine.

8. An oil filter for use in connection with a force feed lubricating system of an internal combustion engine comprising a shell composed of rigidly and permanently connected walls and open at one end, a filter mass in the shell, said filter mass being readily insertable and removable from the shell through the open end thereof, means to conduct fluid under pressure into the inner shell for forced passage through the filter mass toward the open end of the shell, such forced passage of the fluid through the filter mass tending to push the filter mass out through the open end of the shell, means to hold the filter mass in the shell including a stiff cross bar having a detachable connection with the walls of the shell adjacent the open end thereof, a cover to close the open end of the shell and receive filtered fluid discharged from the open end of the shell, an outlet for conducting filtered fluid from the cover to the crankcase of the engine, and means engaged with the cross bar for holding the cover in place.

9. An oil filter for use in connection with an internal combustion engine comprising an inner shell closed at one end and open at the other end, a filter mass in said shell readily insertable and removable therefrom through its open end, means supported solely from the open end portion of the shell for holding the filter mass therein, an outer enclosure encasing the inner shell consisting of separable parts one of which forms a removable cover to afford access to the inner shell for insertion and removal of the filter mass, said other part being fixed with respect to the inner shell, means anchored to the shell and independent of said fixed part of the outer enclosure for readily detachably holding the cover part in place, and means for connecting the interior of the closed end portion of the inner shell with the pressure side of the force feed lubricating system of the engine whereby oil to be filtered is forced through the filter mass to the open end of the filter shell so as to leave the inner shell and enter the outer enclosure at greatly reduced pressure to obviate the necessity for a complicated fluid tight seal between the complementary parts of the outer enclosure, and a return for filtered fluid leading from the outer enclosure to the crank case of the engine.

JOHN W. FITZ GERALD.

CERTIFICATE OF CORRECTION.

Patent No. 2,110,124.            March 8, 1938.

JOHN W. FITZ GERALD.

It is hereby certified that error appears in the printed specification of the above numbered patent requiring correction as follows: Page 3, second column, line 73, claim 6, strike out the words "and adapted to have"; and that the said Letters Patent should be read with this correction therein that the same may conform to the record of the case in the Patent Office.

Signed and sealed this 12th day of April, A. D. 1938.

(Seal)

Henry Van Arsdale,
Acting Commissioner of Patents.

enclosure for the shell and providing a closed chamber for receiving filtered fluid which has been forced through the filter mass, outlet means for conducting filtered fluid from said chamber to the crank case of the engine, means supported entirely from said shell and disposed at the open end of the shell to carry the stress incidental to the forced passage of the fluid through the filter mass, and means engaged with said last named means for readily detachably holding the cover in place so that any force imposed on the cover and tending to unseat it from said fixed wall is carried by said stress carrying means.

7. An oil filter for use in connection with a forced feed lubricating system of an internal combustion engine comprising, a container having an open end, a filter mass in the container, said filter mass being readily insertable and removable through the open end thereof, inlet means for introducing fluid to be filtered from the force feed system into the container for forced passage through the filter mass toward the open end thereof, such forced passage of the fluid through the filter mass tending to push the same out through the open end of the container, means supported entirely by the container to hold the filter mass against being pushed from the open end thereof, and an exterior cover seat fixed with respect to the container, a cover member for the open end of the container, said cover member engaging said seat and cooperating therewith to provide a chamber into which the filtered fluid is discharged from the open end of the container, means receiving support from the container for readily detachably holding the cover in place and for transmitting any stress imposed on the cover in a direction tending to unseat the same to the container, and an outlet leading from said chamber to the crank case of the engine.

8. An oil filter for use in connection with a force feed lubricating system of an internal combustion engine comprising a shell composed of rigidly and permanently connected walls and open at one end, a filter mass in the shell, said filter mass being readily insertable and removable from the shell through the open end thereof, means to conduct fluid under pressure into the inner shell for forced passage through the filter mass toward the open end of the shell, such forced passage of the fluid through the filter mass tending to push the filter mass out through the open end of the shell, means to hold the filter mass in the shell including a stiff cross bar having a detachable connection with the walls of the shell adjacent the open end thereof, a cover to close the open end of the shell and receive filtered fluid discharged from the open end of the shell, an outlet for conducting filtered fluid from the cover to the crankcase of the engine, and means engaged with the cross bar for holding the cover in place.

9. An oil filter for use in connection with an internal combustion engine comprising an inner shell closed at one end and open at the other end, a filter mass in said shell readily insertable and removable therefrom through its open end, means supported solely from the open end portion of the shell for holding the filter mass therein, an outer enclosure encasing the inner shell consisting of separable parts one of which forms a removable cover to afford access to the inner shell for insertion and removal of the filter mass, said other part being fixed with respect to the inner shell, means anchored to the shell and independent of said fixed part of the outer enclosure for readily detachably holding the cover part in place, and means for connecting the interior of the closed end portion of the inner shell with the pressure side of the force feed lubricating system of the engine whereby oil to be filtered is forced through the filter mass to the open end of the filter shell so as to leave the inner shell and enter the outer enclosure at greatly reduced pressure to obviate the necessity for a complicated fluid tight seal between the complementary parts of the outer enclosure, and a return for filtered fluid leading from the outer enclosure to the crank case of the engine.

JOHN W. FITZ GERALD.

CERTIFICATE OF CORRECTION.

Patent No. 2,110,124. March 8, 1938.

JOHN W. FITZ GERALD.

It is hereby certified that error appears in the printed specification of the above numbered patent requiring correction as follows: Page 3, second column, line 73, claim 6, strike out the words "and adapted to have"; and that the said Letters Patent should be read with this correction therein that the same may conform to the record of the case in the Patent Office.

Signed and sealed this 12th day of April, A. D. 1938.

Henry Van Arsdale,
Acting Commissioner of Patents.

(Seal)

CERTIFICATE OF CORRECTION.

Patent No. 2,110,124. March 8, 1938.

JOHN W. FITZ GERALD.

It is hereby certified that error appears in the printed specifica[tion] of the above numbered patent requiring correction as follows: Page 3, sec[ond] column, line 73, claim 6, strike out the words "and adapted to have"; that the said Letters Patent should be read with this correction ther[ein] that the same may conform to the record of the case in the Patent Off[ice].

Signed and sealed this 12th day of April, A. D. 1938.

(Seal)

Henry Van Arsdale,
Acting Commissioner of Paten[ts].